United States Patent
Dower

(10) Patent No.: US 8,985,706 B2
(45) Date of Patent: Mar. 24, 2015

(54) WHEEL PROTECTOR

(76) Inventor: Nicholas Dower, Albert Park (AU)

( * ) Notice: Subject to any disclaimer, the term of this patent is extended or adjusted under 35 U.S.C. 154(b) by 544 days.

(21) Appl. No.: 13/140,820

(22) PCT Filed: Dec. 21, 2009

(86) PCT No.: PCT/AU2009/001669
§ 371 (c)(1),
(2), (4) Date: Sep. 2, 2011

(87) PCT Pub. No.: WO2010/069010
PCT Pub. Date: Jun. 24, 2010

(65) Prior Publication Data
US 2011/0304196 A1  Dec. 15, 2011

(30) Foreign Application Priority Data
Dec. 19, 2008  (AU) ............................... 2008906534

(51) Int. Cl.
*B60B 7/01*  (2006.01)
(52) U.S. Cl.
CPC ........................................ *B60B 7/01* (2013.01)
USPC ....................................................... 301/37.24
(58) Field of Classification Search
CPC ............ B60B 7/01; B60B 7/06; B60B 7/061; B60B 7/063
USPC ........ 301/37.11, 37.22, 37.23, 37.24, 37.101, 301/37.102
See application file for complete search history.

(56) References Cited

U.S. PATENT DOCUMENTS

| | | | | |
|---|---|---|---|---|
| 2,903,300 | A * | 9/1959 | Hurd | 301/37.12 |
| 3,397,921 | A * | 8/1968 | Aske, Jr. | 301/37.42 |
| 6,082,829 | A * | 7/2000 | Chase | 301/37.43 |
| 6,270,167 | B1 * | 8/2001 | Kemmerer et al. | 301/37.43 |
| 6,598,942 | B1 * | 7/2003 | Williams | 301/37.103 |
| 6,779,852 | B2 * | 8/2004 | Van Houten et al. | 301/37.43 |
| 7,296,860 | B2 * | 11/2007 | Dangleman | 301/37.24 |
| 2004/0066084 | A1 * | 4/2004 | Bernoni | 301/37.24 |
| 2004/0113483 | A1 * | 6/2004 | Sylvester et al. | 301/37.11 |
| 2005/0179312 | A1 * | 8/2005 | Hauler | 301/37.43 |
| 2008/0018168 | A1 | 1/2008 | Conaway | |

FOREIGN PATENT DOCUMENTS

| | | |
|---|---|---|
| GB | 2421483 | 6/2006 |
| GB | 2426491 | 11/2006 |
| WO | WO-2008142422 | 11/2008 |

* cited by examiner

*Primary Examiner* — S. Joseph Morano
*Assistant Examiner* — Jean Charleston
(74) *Attorney, Agent, or Firm* — Birch, Stewart, Kolasch & Birch, LLP

(57) ABSTRACT

A wheel rim protector comprising a base comprising an external face and an internal face, the external face comprising a curved profile and a side-wall extending from a first side of the base is disclosed. Also disclosed is a wheel rim protector comprising a base comprising one or more kink and/or curve along a base length, an external face and an internal face and a side-wall extending from a first side of the base. Methods of making the wheel rim protectors are also disclosed.

9 Claims, 2 Drawing Sheets

WHEEL PROTECTOR

FIELD OF THE INVENTION

The present invention relates to a wheel protector or wheel rim protector. In particular, but not exclusively, the present invention relates to a wheel rim protector for protecting a vehicle wheel from damage like that which may occur during parking.

BACKGROUND TO THE INVENTION

Wheel rims are expensive components of vehicles. The cost of wheel rims leads to expense when they must be replaced due to damage. Wheel rims are often and easily damaged when contact is made with gutters and curbs, such as, when parking.

CA02487481 discloses a wheel guard assembly which extends from the wheel hub as a circular disk to protect the tire sidewall. Although the wheel guard assembly of CA02487481 will protect the wheel rim it is cumbersome and unsightly.

GB 2421483 teaches a wheel rim protector that is attached to the tire with an adhesive and may require an installation tool to apply force to aid adhesion. Aside from the difficulties of fitting the wheel rim protector of GB 2421483, fitting to the tire has a negative impact on ride quality, braking and tire wear and may be a safety hazard.

US 2008/0018168 discloses a wheel rim protector that mounts on a wheel rim. The protector of US 2008/0018168 is either annular, in which case it must be sized for each particular wheel rim, or may be extruded into a spool.

GB 2426491 discloses a wheel rim protector that is glued to a wheel rim and which has a lip which overlies the wheel rim.

Any discussion of the prior art throughout the specification should in no way be considered as an admission that such prior art is widely known or forms part of the common general knowledge in the field.

OBJECT OF THE INVENTION

It is an object of the invention to provide a wheel rim protector and/or a method of protecting a wheel rim. A preferred object is to provide a wheel rim protector that has improved adhesion to the wheel rim.

It is an also a preferred object of this invention to overcome or alleviate one or more of the above disadvantages of the prior art and/or provide the consumer with a useful or commercial choice.

Further objects will be evident from the following description.

SUMMARY OF THE INVENTION

The present invention is broadly directed to providing an extrusion or a wheel rim protector that attaches to a vehicle wheel rim. Preferably the wheel rim protector has improved adhesion to the vehicle wheel rim or generates less contact when striking a curb or other surface or both. The improved adhesion may be achieved by providing the wheel rim protector with a curved profile and/or with a curve and/or kink along the length of the wheel rim protector. The lessening of contact when striking a curb or other surface may be achieved by providing the wheel rim protector with a curved profile.

In a first aspect, the invention resides in a wheel rim protector comprising:

a base comprising an external face and an internal face, the external face comprising a curved profile; and a side-wall extending from a first side of the base.

According to the first aspect the curved profile of the external face may extend a full width of the external surface.

According to the first aspect the curved profile of the external face may be curved at a region for overlaying the wheel rim circumferential outer surface.

The curved profile may be outwardly curved or convex.

According to the first aspect the base may comprise one or more kink and/or a curve along a base length.

According to the first aspect the one or more kink and/or curve may be intermittent along the base length.

In a second aspect, the invention resides in a wheel rim protector comprising:

a base comprising one or more kink and/or curve along a base length, an external face and an internal face; and a side-wall extending from a first side of the base.

According to the second aspect the external face may comprise a curved profile.

The curved profile may be outwardly curved or convex.

According to either the first or second aspect the internal face may comprise an adhesive disposed thereon.

According to either the first or second aspect the adhesive may be covered by a removable cover.

According to either the first or second aspect the wheel rim protector may further comprise a dust-cover projection extending from the base on the opposite side to the side-wall.

According to either the first or second aspect the base may comprise a polymeric material and/or a thermoplastic material.

According to either the first or second aspect the wheel rim protector may comprise an extrusion.

According to either the first or second aspect the wheel rim protector may be elongate.

According to either the first or second aspect the side wall when fitted to a rim may not make contact with a tire fitted to the rim.

According to either the first or second aspect the base may cover a circumferential outer surface of a wheel rim.

According to either the first or second aspect the base may be applied to a wheel.

In a third aspect, the invention provides a method of producing a wheel rim protector according to either the first aspect or the second aspect including the step of extruding the wheel rim protector from an extruder to thereby produce the wheel rim protector.

According to the third aspect the method may further include applying an adhesive to the internal face of the wheel rim protector.

In a fourth aspect the invention provides a wheel rim protector produced according to the method of the third aspect of the invention.

In a fifth aspect the invention provides a method of protecting a wheel rim including the step of applying a wheel rim protector according to either the first, second and/or third aspects to a wheel rim to thereby protect the wheel rim.

In a sixth aspect the invention provides a vehicle wheel and/or vehicle wheel rim comprising a wheel rim protector according to the first, second and/or third aspects.

In a seventh aspect the invention provides an extruder for extruding the wheel rim protector according to either the first aspect or the second aspect.

In an eighth aspect the invention provides a system for extruding the wheel rim protector according to either the first aspect or the second aspect.

Further features of the present invention will become apparent from the following detailed description.

In this specification, the terms "comprises", "comprising" or similar terms are intended to mean a non-exclusive inclusion, such that a method, system or apparatus that comprises a list of elements does not include those elements solely, but may well include other elements not listed.

BRIEF DESCRIPTION OF THE DRAWINGS

In order that the present invention may be readily understood and put into practical effect, reference will now be made to the accompanying illustrations wherein like reference numerals refer to like elements and wherein.

DETAILED DESCRIPTION OF THE INVENTION

The invention relates, at least in part, to a wheel rim protector that attaches to a wheel rim. Preferably the wheel rim protector comprises improved adhesion to the wheel rim or generates less contact when striking a curb or other surface or both.

The present inventors have advantageously found that improved adhesion to a wheel can be achieved by either providing the wheel rim protector with a curved profile and/or with a kink or curve along the length of the wheel rim protector.

The present invention has particular application to the protection of vehicle wheel rims such as car and other vehicle rims. The present invention advantageously avoids the damage to rims that frequently occurs when curbs are contacted during parking.

Figure 1:
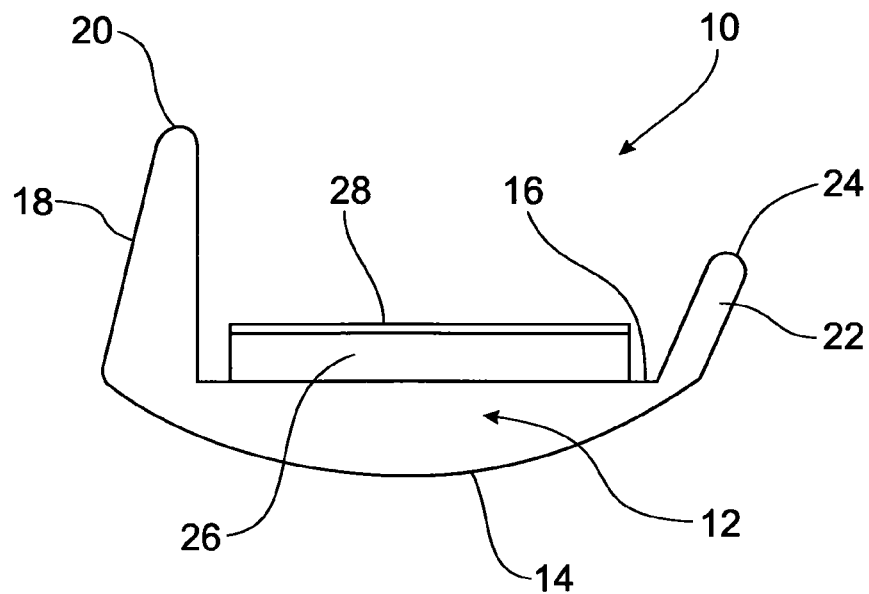
FIG. 1 is a schematic diagram illustrating one embodiment of the invention.
Figure 2:
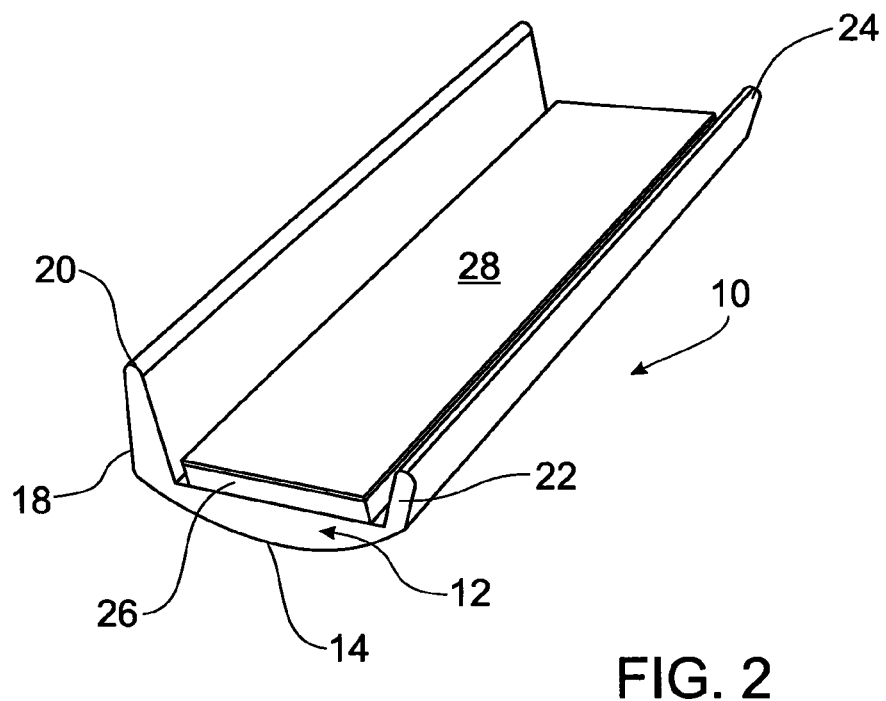
FIG. 2 is a perspective view illustrating one embodiment of the invention.

FIG. 1 shows one embodiment of a wheel rim protector 10 which comprises base 12. Base 12 comprises an external face 14 which comprises a curve or a curved profile and an internal face 16 which has an adhesive 26 disposed thereon. In other embodiments the adhesive may be applied to the wheel rim protector 10 before fitting to a wheel rim.

Side-wall 18 extends from a first side of base 12 and dust-cover projection 22 extends from base 12 on the opposite side to the side-wall 18.

Figure 3:
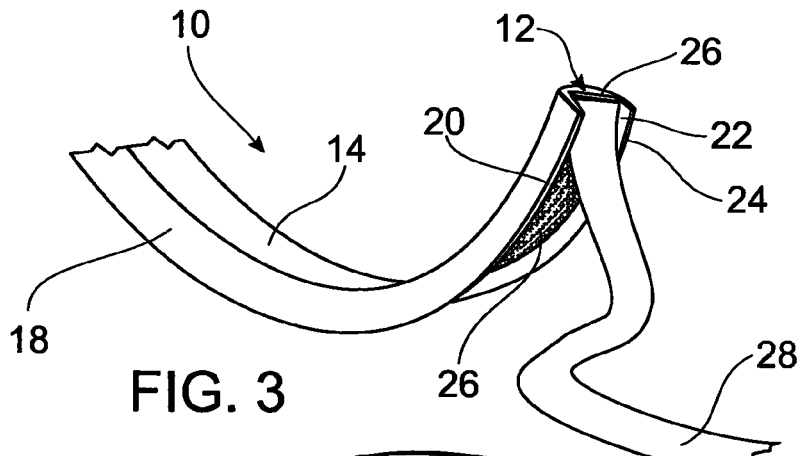
FIG. 3 is a perspective view showing one embodiment of the invention in which the cover is being removed.
Figure 4:
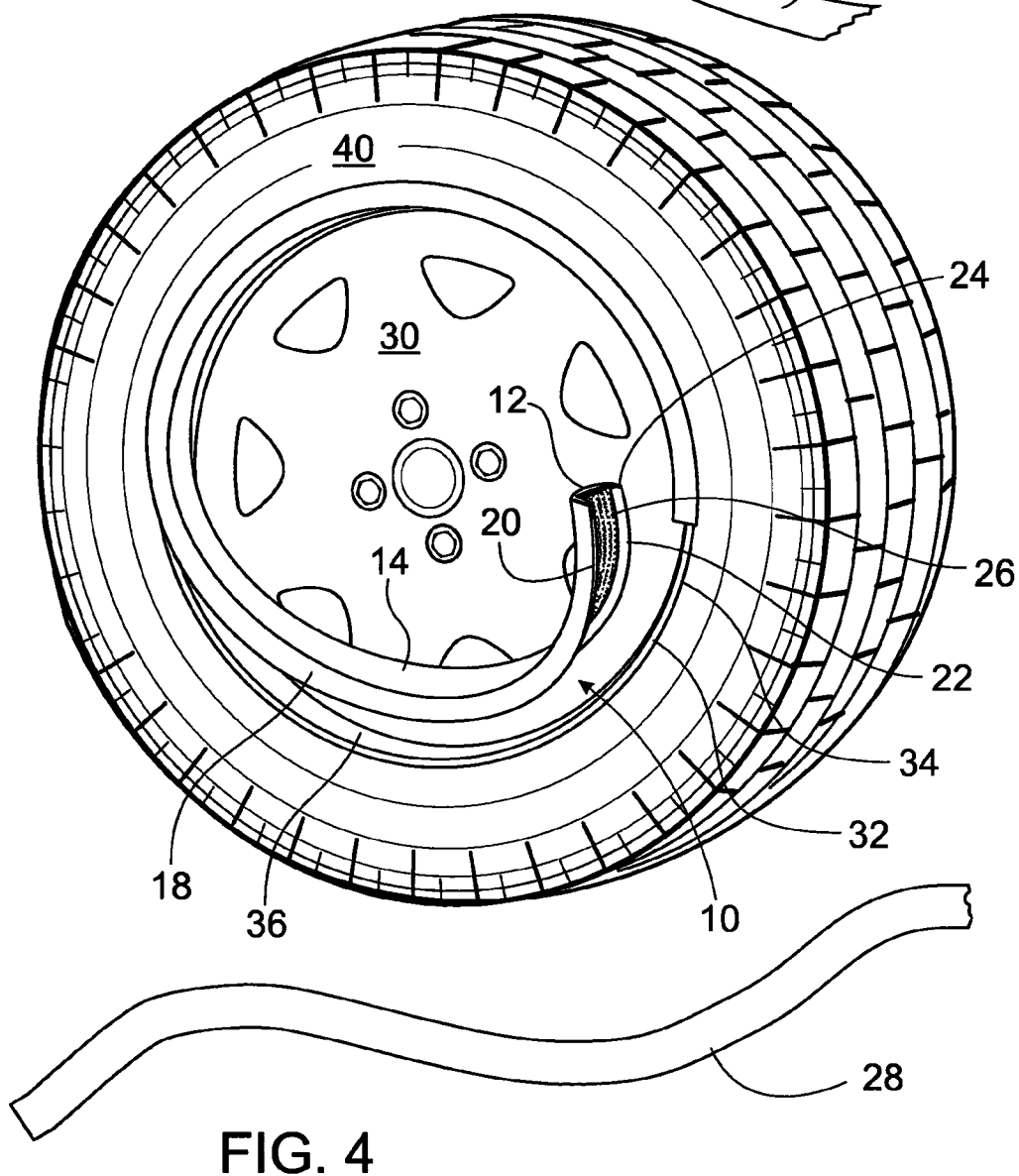
FIG. 4 is a perspective view illustrating one embodiment of the invention being applied to a wheel rim.

The adhesive 26 has a removable cover 28 which is removed to expose the adhesive before fitting the wheel rim protector 10 to a wheel rim 30, as shown in FIG. 3. From FIG. 4 it can be seen that adhesive 26 adheres to the wheel rim circumferential outer surface 32. In this arrangement base 12 overlies and protects wheel rim 30 circumferential outer surface 32 which is the surface most likely to contact a curb. Removable cover 28 may be removed easily by hand without any tools.

When fitted to the wheel rim 30, side-wall 18 overlies and protects the wheel rim circumferential outer edge 34. Side-wall 18 also extends over part of the tire engaging surface 38 (not shown) which adjoins the wheel circumferential outer edge 34. Preferably, side-wall 18 does not make contact with the tire 40 fitted to wheel rim 30.

Wheel rim protector 10 can be easily fitted to a wheel rim 30 without any special tools and without removing or deflating tire 40. This means a user can readily apply wheel rim protector 10 by themself.

When fitted to wheel rim 30 dust-cover projection 22 partially overlies and protects that surface of the rim 30 that extends inwardly with respect to the wheel axle from the circumferential outer surface 32, the circumferential inner angled surface 36. The primary function of dust-cover projection 22 is to prevent dust and other particulate from associating with adhesive 26 and thereby negatively impacting on the seal between the protector 10 and wheel rim 30.

Side-wall 18 extends at a right-angle or a 90° angle from base 12. In other embodiments side-wall 18 extends at 60°, 65°, 70° or 85°. Based on the teachings herein, a person of skill in the art is readily able to choose an appropriate angle.

Dust-cover projection 22 extends at an angle of 113° from base 12. In another embodiment dust-cover projection 22 may extend at 100°, 105°, 110°, 115°, 120°, 125° or 130°. Based on the teachings herein, a person of skill in the art is readily able to choose an appropriate angle.

Advantageously, by disposing dust-cover projection 22 at an angle it may readily conform to most rim types without negatively impacting on the adhesion of protector 10.

In another embodiment dust-cover projection 22 may be a second side wall similar to side-wall 18 and overlie and protect circumferential inner angled surface 36.

The curved profile of external face 14 extends the full width of base 12, i.e. from the edge or shoulder of base 12 that adjoins side-wall 18 to the edge or shoulder of base 12 adjoining dust-cover projection 22. In another embodiment the curved profile extends only a part of the external face 14. Suitably, the curved profile is curved at part or all of a region overlaying the wheel rim circumferential outer surface 32. Preferably, the curved profile is located at a section of external face 14 most likely to contact a curb.

The curved profile may be outwardly curved or convex.

In another embodiment the profile of external face 14 is angled so that the base 12 reduces in thickness from a region near side-wall 18 towards a region near dust-cover projection 22.

The curved profile extends along the length of the base 12 that is to overlay a wheel rim.

The surface of internal face 16 is substantially planar or planar to conform with the substantially planar or planar surface of the outwardly-facing circumferential outer surface 32 of wheel rim 30 to which protector 10 is adhered.

Side-wall top 20 and dust-cover top 24 are curved. This is of advantage because it avoids edges which may be prone to being pulled at or on and result in removal of protector 10. Curved tops 20, 24 also reduce the chance of cutting the skin when protector 10 is being applied.

Side-wall 18 becomes incrementally thinner from the edge or shoulder of base 12 that adjoins side-wall 18 to side-wall top 20. The thinning is accomplished by having the outer surface of side-wall 18 angled inwardly and the inner surface of side-wall 18 perpendicular. In other embodiments side-wall 18 is of constant thickness or substantially constant thickness.

Dust-cover projection 22 is of constant thickness. In other embodiments dust-cover projection 22 becomes incrementally thinner from the edge or shoulder of base 12 adjoining dust-cover projection 22 to dust-cover top 24.

Protector 10 is attached with adhesive 26 which is a pressure sensitive tape approved for use by auto manufacturers. In other embodiments adhesive 26 may be a pressure sensitive adhesive, a two part adhesive, cyanoacrylate or any other suitable type of adhesive or adhesive system.

Adhesive 26 is removable allowing the wheel rim protector 10 once applied to a wheel rim 30 to be removed from the wheel by hand. In another embodiment the removable adhesive 26 requires a solvent for removal of the wheel rim protector 10.

Protector 10 is made from a single material. In another embodiment protector 10 may be manufactured from two or more different materials.

Adhesive 26 does not cover all of internal face 16 and there is a gap between the adhesive 26 and side-wall 18 and dust-cover projection 22. In another embodiment adhesive 26 may cover all of internal face 16.

The outermost layer of protector 10 is base 12, in another embodiment a more rigid outer skin may be mounted on external face 14. The rigid outer skin may have a decorative feature that may include colored or metalized films, paint, printing, decal, decoration or any other cosmetic element.

In another embodiment protector 10 has an outermost layer of decorative material.

Protector 10 is extruded. In extruded protector 10, base 12, side-wall 18 and dust-cover projection 22 are formed in an integral product. When extruded protector 10 is elongate and has two free ends. This allows protector 10 to be cut to size as required to fit to wheel rim 30. This has clear advantages over annular protectors which must be manufactured to size, and stocked and purchased carefully.

In another embodiment protector 10 may be molded, cast, forged, stampled, machined or made with another forming method or manufacturing process.

When extruded into a length wheel rim protector 10 may be spooled for storage.

Protector 10 is comprised of Santoprene which is a mixture of in-situ cross linking of ethylene propylene diene M-class (EPDM) rubber and polypropylene. Other suitable polymeric material and/or thermoplastic materials may be used such as, a thermoplastic elastomer and/or an elastomer.

Protector 10 is designed to resist abrasion and remain on the wheel rim for repeated use. Protector 10 is a dark colour which hides abrasion and is made of a high abrasion resistance Santoprene. Suitable dark colours include grey, black, brown and purple.

Although it is able to resist abrasion protector 10 is also a replaceable item so that when damaged, if so desired, it may be removed and replaced.

Protector 10 has a specific gravity of 0.97 g/cc at 23° C. as assessed by ASTM D792; a shore hardness of 64.0 at 0.12 in as assessed by ASTM D2240; an ultimate tensile strength of 2.62 MPA as assessed by across flow ASTM D4112; a tensile strength at break of 4.87 MPa as assessed by ASTM D471; an elongation at break of 229.5% as assessed by ASTM D471; a tear strength of 23.0 kN/m as assessed by ASTM D624; and a compression set of 18% and 44% as assessed by ASTM D395. A skilled person may select other suitable specific gravities, shore hardness, tensile strengths, elongation at break, tear strengths and compression set.

The extrusion conditions used to manufacture protector 10 are a processing temperature of 175-230° C.; a rear barrel temperature of 177° C.; a middle barrel temperature of 182° C.; a front barrel temperature of 182° C.; a nozzle temperature of 188-221° C.; a die temperature at extrusion of 199° C.; a melt temperature at processing of 193-232° C.; a melt temperature at extrusion of 196° C.; a drying temperature of 82.2° C.; a dry time of 3 hours; a moisture content of 0.08%; a back pressure of 0.345-0.689 MPa at processing; a back pressure of 5-20 MPa at extrusion; a clamp pressure of 41.4-68.9 MPa; a vent depth of 0.00254 cm; a cushion of 0.317-0.635 cm; and a screw speed of 100-200 rpm.

From the teachings herein a skilled person is readily able to select an appropriate extrusion method and appropriate extrusion conditions which may differ to the above.

Of significant advantage during extrusion wheel rim protector 10 may be extruded to have one or more kink or a curve disposed along the base length. The kink may be a biasing towards one direction.

The kink or curve may be a bend biased towards a consistent and/or same direction. The bend may be a small bend.

The curve may be a slight curve selected to assist the wheel rim protector adopt a curved shape to adhere to a wheel rim. The angle may be between 1° and 25°. Suitably the angle may be between 1° and 10°. More suitable the angle may be between 1° and 5°. The angle may be 1, 1.5, 2.0, 2.5, 3.0, 3.5, 4.0, 4.5, 5.0, 6, 7, 8, 9, 10, 11, 12, 13, 14, 15, 16, 17, 18, 19, 20, 21, 22, 23, 24 or 25°.

The kink may be intermittent and disposed at a regular interval along the base length. The kink may be disposed at every 10 cm of base length. In other embodiments the kink may be disposed at 5, 10, 15, 20, 25, 30 or 35 cm intervals.

The invention also provides a method of producing a wheel rim protector 10 including the step of extruding the wheel rim protector 10 from an extruder to thereby produce the wheel rim protector 10.

The method may also include applying the adhesive to the wheel rim protector 10

Additionally, the invention provides a method of protecting a wheel rim 30 including the step of applying a wheel rim protector 10 to thereby protect the wheel rim.

The invention further provides a wheel and/or wheel rim that is fitted with protector 10.

The wheel rim 30 may be cleaned and/or dried, as necessary, before fitting the protector.

The invention also provides an extruder for extruding the wheel rim protector 10.

The invention also provides a system for extruding the wheel rim protector 10.

The present invention provides great advantages to those who wish to protect their vehicle wheel rims from damage.

The present invention provides an affordable means of protecting the significant outlay many car enthusiasts make in fitting their vehicles with rims. Protector 10 is of significant advantage because it is easy to fit, blends to the rim and covers any existing damage.

Further, the present invention may itself provide a decorative or pleasing look to vehicle rims.

Throughout the specification the aim has been to describe the preferred embodiments of the invention without limiting the invention to any one embodiment or specific collection of features. It will therefore be appreciated by those of skill in the art that, in light of the instant disclosure, various modifications and changes can be made in the particular embodiments exemplified without departing from the scope of the present invention.

All computer programs, algorithms, industrial, patent and scientific literature referred to herein is incorporated herein by reference.

The invention claimed is:
1. A wheel rim protector comprising:
 (i) an elongate base comprising an external face and an internal face;
 (ii) a side-wall extending from a first side of the base to overlay a wheel rim edge when fitted to a wheel rim;
 (iii) a dust cover projection extending from a second side of the base in the same general direction as the side-wall to overlay and protect a surface of the wheel rim; and

(iv) an adhesive disposed on the internal face between the side-wall and the dust cover projection;

wherein the dust cover projection and the side-wall are configured such that dust and other particulate matter is prevented from associating with the adhesive, and wherein the dust cover projection extends at a non-right angle to the elongate base.

2. The wheel rim protector of claim 1 wherein the external face comprises a curved profile which extends a full width of the external surface.

3. The wheel rim protector of claim 1 wherein the external face is curved at a region for overlaying the wheel rim circumferential outer surface.

4. The wheel rim protector of claim 1 wherein the base comprises one or more kink and/or a curve along a base length.

5. The wheel rim protector of claim 4 wherein the one or more kink and/or curve is intermittent along the base length.

6. The wheel rim protect or of claim 1 wherein the dust-cover projection extends from the base on the opposite side from the side-wall.

7. The wheel rim protector of claim 1 wherein the side-wall when fitted to a rim does not make contact with a tire fitted to the rim.

8. A method of protecting a wheel rim including the step of applying a wheel rim protector according to claim 1 to a wheel rim to thereby protect the wheel rim.

9. A vehicle wheel and/or vehicle wheel rim comprising a wheel rim protector according to claim 1.

* * * * *